United States Patent [19]
Evans

[11] Patent Number: 5,337,612
[45] Date of Patent: Aug. 16, 1994

[54] APPARATUS FOR PRESSURE TRANSDUCER ISOLATION

[75] Inventor: Paul S. Evans, Salt Lake City, Utah

[73] Assignee: Quartzdyne, Inc., Salt Lake City, Utah

[21] Appl. No.: 894,832

[22] Filed: Jun. 8, 1992

[51] Int. Cl.⁵ .............................................. G01L 7/06
[52] U.S. Cl. .................... 73/706; 73/729.1; 73/756
[58] Field of Search ............... 73/706, 708, 715-729.1, 73/756

[56] References Cited

U.S. PATENT DOCUMENTS

| | | |
|---|---|---|
| 1,841,848 | 1/1932 | Quinby ................................ 73/706 |
| 2,725,749 | 12/1955 | Green ................................. 73/706 |
| 3,851,530 | 12/1974 | Symonds et al. ...................... 73/706 |
| 4,077,882 | 3/1978 | Gangemi ............................. 73/706 |
| 4,109,531 | 8/1978 | Lawford et al. ...................... 73/706 |
| 4,218,925 | 8/1980 | DiDomizio, Jr. ..................... 73/706 |
| 4,461,180 | 7/1984 | Hellouin de Menibus ........... 73/706 |
| 4,507,972 | 4/1985 | Morita ............................... 73/706 |
| 4,713,969 | 12/1987 | Ishii .................................. 73/706 |

FOREIGN PATENT DOCUMENTS

| | | |
|---|---|---|
| 0841799 | 6/1952 | Fed. Rep. of Germany ........ 73/706 |
| 0505503 | 5/1939 | United Kingdom .................. 73/706 |
| 578632 | 7/1946 | United Kingdom .................. 73/706 |
| 2106248 | 4/1983 | United Kingdom .................. 73/704 |

*Primary Examiner*—Donald Woodiel
*Attorney, Agent, or Firm*—Trask, Britt & Rossa

[57] ABSTRACT

A transducer sensing element isolation assembly including a pressure housing having a chamber in which the sensing element is disposed, which sensing element communicates with the interior of a bellows through a sealing element disposed between the pressure housing and a base on which the bellows is secured. The chamber, bellows interior and sealing element are filled with a dead volume of low compressibility, low thermal expansion isolation fluid. The bellows is contained in a replaceable bellows capsule which is threaded into a bellows capsule cavity into which the chamber communicates, and the sealing element is maintained in place by the capsule being made up into the cavity.

19 Claims, 2 Drawing Sheets

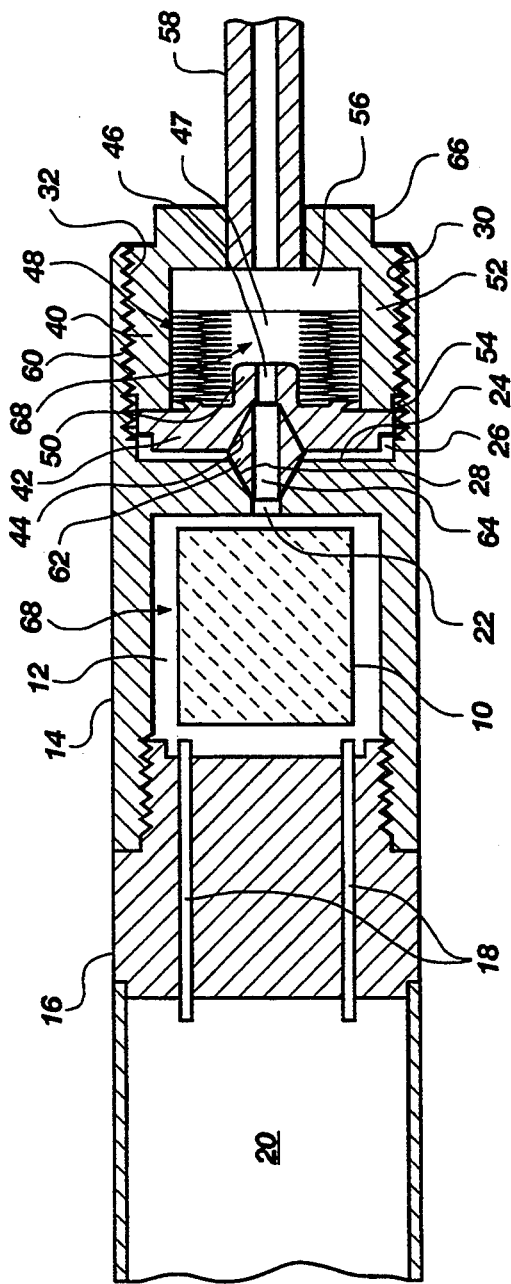
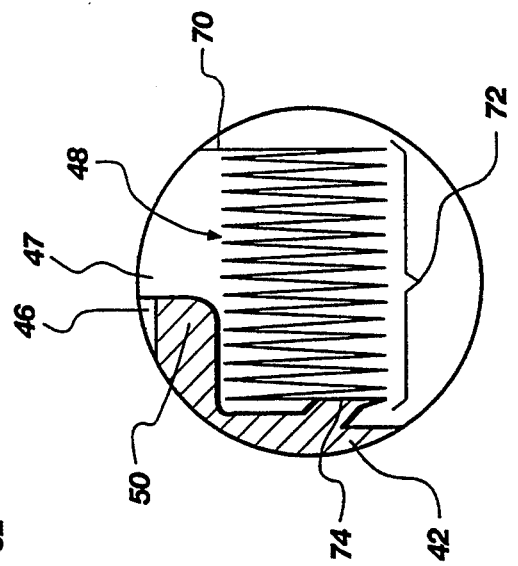
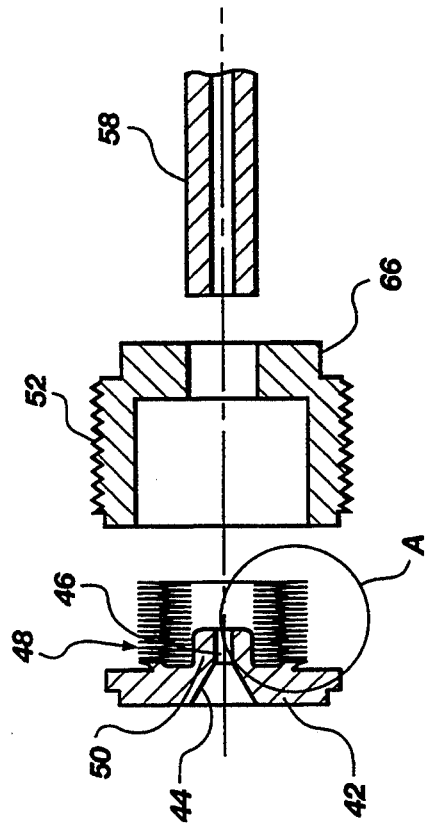

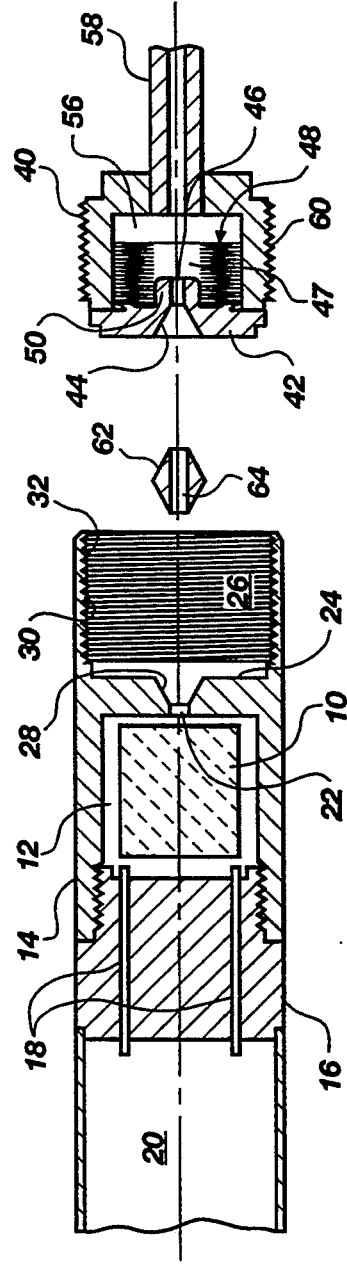
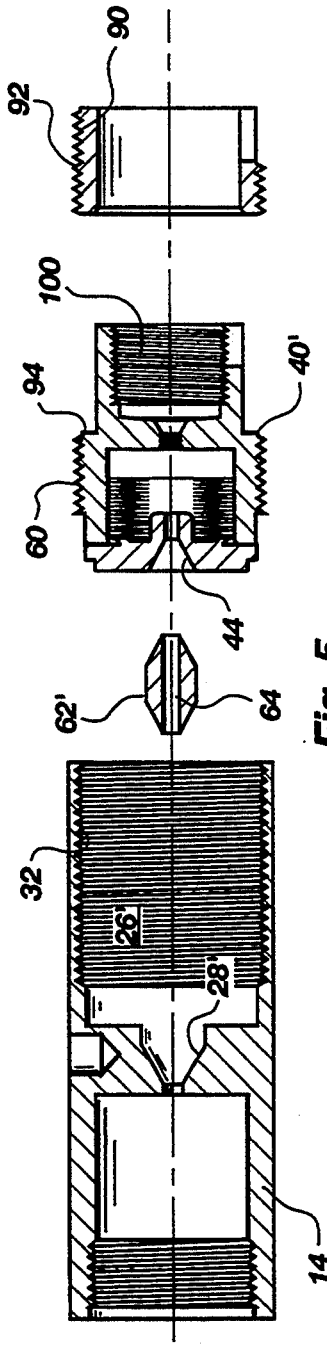
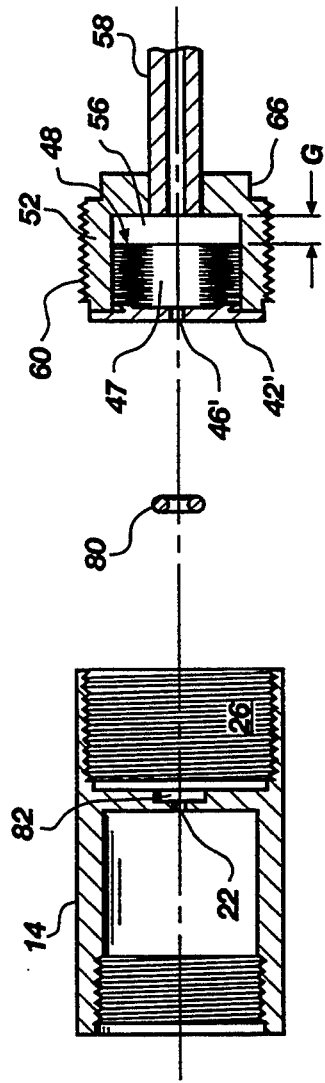

APPARATUS FOR PRESSURE TRANSDUCER ISOLATION

BACKGROUND OF THE INVENTION

1. Field

The present invention relates generally to isolation of a pressure transducer from a fluid medium, the pressure of which is being measured by the transducer. The invention relates more specifically to an apparatus for isolation of a pressure transducer sensing element from the hostile effects of a fluid environment to which the sensing element is exposed for pressure measurement purposes, without compromising or deleteriously affecting the performance characteristics of the transducer.

2. State of the Art

It is common practice to dispose an isolation element and an isolation fluid between a fluid which is being monitored for pressure and pressure changes and the sensing element of the transducer used to conduct the measurements. Isolation elements in the prior art include diaphragms of many designs, and a wide variety of fluids including water and many different hydrocarbon liquids have been employed as isolation fluids.

It is important that any transducer isolation scheme not only protect the transducer from the fluid environment being measured, but that the isolation components not compromise the accuracy, response time and repeatability of the transducer when in use. Although somewhat self-evident, it is also important that an isolation element itself, and its connection to the transducer or housing in which the transducer is placed, be substantially immune to any hostile characteristics of the fluid environment.

Many transducer applications in industry and commerce would benefit from a rugged, durable, non-performance degrading means of isolating a pressure transducer from the fluid medium being measured. The need for such an isolation means has long been recognized in such diverse areas of application as petroleum exploration, aerospace, purified liquid and gas handling, and petrochemical and other industrial processes. Many such applications impose certain limitations on the design and materials which may be employed for an isolation scheme.

First, applications such as downhole use in oil, gas and geothermal well bores may impose size limitations on the transducer employed as well as on any isolation assembly, including an isolation element. Clearances in drill pipe and tubing, added to wall thicknesses necessary for pressure housings capable of protecting electronic instrumentation to pressures well in excess of 20,000 psi, generally dictate that transducer size be limited to an overall diameter not exceeding one inch (1"). Further, due to the necessarily soft and frictionless nature required of an isolation element so as not to compromise the performance characteristics of the transducer, the size and mass of the isolation element must be kept to an absolute minimum in order to minimize orientation sensitivity due to gravity. Orientation sensitivity is particularly intolerable in highly deviated and horizontal wells. Another limitation related to size of the isolation element is the volume of fluid disposed between the isolation element and the sensing element of the transducer which transmits pressure between the two. The larger the fluid volume and more compressible the isolation fluid, the more stroke or travel is required of the isolation element. This trade-off between volume/compressibility and travel reaches the point where the external pressure ceases to be transmitted completely to the sensing element as the volume of fluid becomes overly large.

Material selection for the isolation element is also somewhat limited by the hostile environment to which the transducer is intended to be exposed. Many environments, for reasons of corrosive effects and conductivity, must be kept from contacting the sensing element itself. Examples of such hostile environments include hydrogen sulfide, carbon dioxide, oxygen, water, and various solvents, some of which readily permeate thin membranes of all known elastomers and also attack many common metals.

Even with the use of corrosion-resistant materials, serviceability of the isolation element is desirable so that it can be cleaned and replaced if necessary, as even corrosion-resistant metals, particularly if of thin cross-section, deteriorate over time when subjected to highly corrosive fluids. Elevated temperatures, such as are experienced in well bores and in many industrial processes, accelerate such deterioration. In addition to corrosion-induced deterioration, most isolation schemes are subject to performance degradation due to particulate contamination. Since, in order to assure optimum transducer performance, the isolation element must be as nearly frictionless and as repeatable as possible, any particulate contamination which interferes with the active or movable part of the isolation element poses the threat of increased friction and interference with travel, each and both of which reduce repeatability.

Finally, a transducer must be easily assembled with its isolation element and isolation fluid, the "dead volume" portion of the assembly between the isolation element and sensing element being completely purgeable of all entrapped gases due to the high compressibility of gases relative to liquids. Furthermore, the dead volume must be repeatable as the transducer is assembled and reassembled over a period of time as isolation elements are replaced. Without such repeatability, which assures the same spring constant and travel range for the isolation element time after time, the transducer would have to be recalibrated throughout its entire range with each isolation element replacement.

Therefore, in summary, it may be said that there has been a long-felt and unmet need for a transducer isolation means of small size and volume, constructed of a rugged, corrosion-resistant material and of a design and construction promoting serviceability and ease of assembly and reassembly with a repeatable end result in terms of performance.

One commonly employed isolation element is a bellows-type diaphragm, various examples of which are disclosed in U.S. Pat. Nos. 1,841,848; 4,077,882; 4,109,531; 4,218,925; 4,461,180; 4,507,972; 4,713,969; U.K. Patent 578,632; and U.K. Patent Application 2106248. However, all such prior art bellows-type isolation schemes are deficient in one or more of the above-enumerated desired characteristics.

SUMMARY OF THE INVENTION

The present invention comprises a transducer isolation means including a first isolation fluid zone in which the pressure sensing element of the transducer is disposed, which first zone communicates via an aperture with a second isolation fluid zone to which external pressure is applied through a bellows-type isolation element.

The first isolation fluid zone is defined by the pressure housing of the transducer, the sensing element being in electrical communication with other electronic transducer components through high-pressure electrical feedthroughs on one side, while a first aperture extends through the pressure housing on the other side of the sensing element. A bellows defines the second isolation fluid zone, and the open end thereof is in proximity to a second aperture in a capsule to which the bellows is sealed at its periphery, the capsule being threadable into the pressure housing with a sealing element disposed between the bellows capsule aperture and the pressure housing aperture and including a passage extending therebetween connecting the first and second isolation fluid zones. The exterior of the bellows in a chamber within the bellows capsule is exposed to the environmental fluid being measured via an inlet conduit extending to the wellbore, process stream, or other fluid source. The isolation fluid is substantially incompressible and of a low coefficient of thermal expansion. The bellows has a low spring constant and is fabricated of a corrosion-resistant material. As a result, any pressure difference across the bellows is indiscernible and of no noticeable effect on transducer performance.

The transducer isolation apparatus of the present invention provides a configuration wherein only the exterior of the bellows and the interior of the bellows capsule are exposed to the hostile environmental fluid. The sealing element between the pressure housing and the bellows capsule is not subject to the environmental fluid, and serves to permit leakage of air and excess isolation fluid from the isolation system as it is being assembled and tightened. The design of the isolation apparatus facilitates assembly, disassembly, and servicing while assuring consistent, repeatable transducer performance without full recalibration each time the apparatus is assembled or reassembled.

BRIEF DESCRIPTION OF THE DRAWINGS

FIG. 1 is a side sectional elevation of a transducer pressure housing including a transducer sensing element assembled with a first preferred embodiment of the isolation means of the present invention;

FIG. 2 is an exploded side sectional elevation of a bellows isolation capsule employed in the isolation means of the present invention;

FIG. 2A is an enlarged view of a portion of the bellows employed in the bellows isolation capsule of FIG. 2, taken at "A" thereon;

FIG. 3 is an exploded side sectional elevation of the embodiment of FIG. 1 of the isolation means of the present invention;

FIGS. 4 and 5 are exploded side sectional elevations of alternative embodiments of the isolation means of the present invention.

DETAILED DESCRIPTION OF THE ILLUSTRATED EMBODIMENTS

Referring to FIGS. 1, 2, 2A and 3 of the drawings, pressure sensing element 10 of a pressure transducer is encased inside chamber 12 of pressure housing 14. One end of chamber 12 is closed off by a high-pressure feedthrough 16 which contains the pressure to which sensing element 10 is subjected while transmitting electrical signals via conductors 18 to and from transducer electronics (not shown) in electronics chamber 20. The other end of chamber 12 includes a small, centered aperture 22 extending into and through the bottom 24 of bellows capsule cavity 26. The outer end of hole 22 comprises a frustoconical bore 28, and the interior bore wall 30 of cavity 26 is threaded, as at 32.

Bellows isolation capsule 40 includes a circular bellows base 42 having a frustoconical entry bore 44 necking down to a smaller aperture 46 which communicates with the interior 47 of bellows 48 through tubular bellows stop 50. Bellows capsule shell 52 surrounds bellows 48 and, when affixed to the periphery of bellows base 42 at 54, defines an environmental fluid chamber 56 in which bellows 48 is contained.

A pressure input tube 58 is secured to the end of capsule shell 52 opposite bellows base 42 and conducts the pressurized environmental fluid to be measured from its source (such as a well bore, process stream, etc.) into environmental fluid chamber 56. Bellows isolation capsule 40 includes threads 60 on the exterior of capsule shell 52, by which it is secured within capsule cavity 26, a double-ended frustoconical metal sealing cone 62 being disposed and maintained between pressure housing 14 and bellows isolation capsule 40, sealing against frustoconical bores 28 and 44. Sealing cone 62 provides a seal against environmental fluid which may leak past mating threads 32 and 60, and forms a conduit between chamber 12 and the interior 47 of bellows 48 through bore 64. Wrench flats 66 on bellows isolation capsule 40 facilitate the ease with which the latter may be made up into bellows capsule cavity 26 of pressure housing 14. The "dead volume" 68 of the isolation assembly or apparatus of the invention, comprising chamber 12, the interior 47 of bellows 48 and the fluid path extending through sealing cone 62 is filled with a highly incompressible, low thermal expansion liquid such as Di-2-ethyl hexylsebacate or Mobil 1 ® synthetic motor oil.

The bellows capsule 40 preferably comprises a metal (corrosion-resistant stainless steel) bellows 48, edge welded as shown generally at 72 on FIG. 2A, closed on one end by an edge welded solid disk 70 and having its open end welded at 74 to machined cylindrical bellows base 42 with aperture 46 in the center. The aperture 46 must be small enough to retain the isolation fluid within the bellows interior 47 when the welded and filled bellows capsule 40 is inverted. A suitable hole size is <0.100". After base 42 and bellows 48 are joined, capsule shell 52 is welded to base 42 at 54. Although not preferred, a formed metal bellows integrally attached to a base could be used in lieu of a welded bellows.

Several features of the bellows capsule enhance its utility. The first is a tubular bellows stop 50, the height of which coincides with that of bellows 48 in its fully compressed state. The presence of stop 50 reduces the internal dead volume of the isolation means, and hence reduces the travel required by bellows 48 for a given temperature and pressure range. In addition, stop 50 provides significant overpressure protection for bellows 48, as it prevents the center portion of bellows disk or end plate 70 from plastically deforming into the interior of the bellows 48 and ultimately failing. Such deformation could otherwise occur from overpressurization of the bellows 48, or to a loss of isolation fluid due to a weld or seal failure. To further enhance overpressure protection, disk 70 is of thicker material than the remainder of the bellows 48 to reduce the possibility of deformation under pressure.

The foregoing isolation apparatus design provides the important advantage that the pressurized environmental fluid being measured only comes into contact with the welded metallic portion of the bellows capsule and does not normally contact the sealing cone 62 or have the opportunity to contact the internal dead volume 68 of isolation fluid. Furthermore, as the pressure drop across the bellows is nominal, the likelihood of a contaminating leak developing in the bellow and welds is minimized. If such a leak does occur, the bellows capsule 40 is simply replaced. However, the design of the bellows capsule set forth above would prevent such an occurrence in substantially all normal circumstances.

Assembly of the bellows isolation capsule 40 with pressure housing 14 should be performed in a particular manner for optimum results.

The pressure housing 14, sensing element 12 and feedthrough 16 are assembled and welded, as is the bellows capsule 40 as noted above. Before the capsule shell 52 is welded to the base 42, the bellows 48 should be extended sufficiently so that its free length slightly exceeds that of the depth of the internal bore of capsule shell 52.

The welded bellows capsule 40 and pressure housing 14 with sensing element 12 and sealing cone 62 in place are then placed in a vacuum and filled with isolation fluid. After returning to ambient pressure, the bellows capsule 40 is then installed in the capsule cavity 26 by placing the pressure housing 14 with capsule cavity 26 facing upwards, inverting the bellows capsule 40 and making up the threads of the two components. During this process the excess isolation fluid in the housing and unwanted air in the assembly are permitted to escape between threads 32 and 60. As the bellows capsule 40 is completely made up with the pressure housing 14, sealing cone 62 seals with both and completes the closure of the dead volume 68 of isolation fluid.

FIGS. 4 and 5 depict alternative embodiments of the isolation means of the present invention in combination with a pressure housing. The embodiment of FIG. 4 employs an O-ring seal 80 disposed in recess 82 of pressure housing 14 around aperture 22 in lieu of a metal sealing cone, and may or may not include a bellows stop in base 42'. A small aperture 46' extends from bellows base 42' into the interior 47 of bellows 48. The embodiment of FIG. 5 includes an elongated sealing cone 62' for better alignment of the cone with respect to frustoconical bores 28' and 44, bore 28' being elongated to better constrain sealing cone 62' against tilting or cocking. The embodiment of FIG. 5 further includes a locking clamp nut 90 having threads 92 thereon to cooperate with internal threads 32 of elongated capsule cavity 26' in order to lock bellows capsule 40' (slightly modified from capsule 40) in cavity 26'. Locking clamp nut 90 will rest on annular shoulder 94 on capsule 40' when both are fully inserted in capsule cavity 26'. In lieu of a pressure input tube, capsule 40' employs a larger threaded bore 100 for use with a detachable pressure coupling.

Setting the initial bellows height is important to the optimum functioning of the invention. The gap (denoted in FIG. 4 as "G") between the top plate or disk 70 of the bellows 48 and the inner end face of the capsule shell 52 should approach zero as the transducer approaches the condition of maximum internal dead volume at maximum design temperature and minimum pressure. This is necessary to ensure, before minimum dead volume (minimum temperature and maximum design pressure) is reached, that bellows 48 does not fully compress and cease to transmit additional applied pressure to the sensing element 12. In other words, the initial height setting is important to the proper functioning of the transducer throughout the entire intended operating temperature and pressure range.

In all of the embodiments of the invention disclosed herein, such gap setting may be effected after the bellows capsule is initially partially made up in capsule cavity 26 of pressure housing 14. At such point, the assembly is placed in an oven and allowed to completely and uniformly heat to a temperature slightly above the maximum design temperature for transducer operation. The internal isolation fluid expands and escapes past the sealing element (cone or O-ring) and out the threads. The heated assembly is then removed from the oven and quickly tightened before cooling, capturing a final quantity of isolation fluid inside the dead volume of the transducer. As the assembly cools, the bellows 48 compresses or contracts due to thermal contraction of the isolation fluid, pulling bellows 48 away from the capsule shell inner end face and creating the desired gap.

Thus it will be readily apparent to one of ordinary skill in the art that a novel and unobvious transducer isolation apparatus has been disclosed in several exemplary embodiments. Of course, many additions, deletions and modifications to the disclosed embodiments may be made without departing from the scope of the invention as hereinafter claimed.

What is claimed is:

1. An apparatus for isolating the sensing element of a pressure transducer from a hostile fluid environment, comprising:

a pressure housing defining a first chamber enclosing said sensing element and having a first aperture through the wall thereof;

a bellows capsule including a second chamber defined by the interior of a bellows sealed to a base having a second aperture therethrough and a shell disposed over said bellows and sealingly secured to said base;

sealing means between said first chamber and said second chamber for sealed communication from said hostile fluid environment between said first aperture and said second aperture; and an isolation liquid completely filling said first and second chambers;

said shell and said base defining an environmental fluid chamber surrounding said bellows for subjecting the exterior thereof to said environmental fluid in isolation from said isolation liquid.

2. The apparatus of claim 1, wherein said pressure housing further includes an integral bellows capsule cavity into which said first aperture opens from said first chamber, and said bellows capsule is insertable and securable in said bellows capsule cavity with said first and second apertures axially aligned.

3. The apparatus of claim 2, wherein said bellows capsule cavity is internally threaded and said bellows capsule is matingly externally threaded.

4. The apparatus of claim 1, wherein said base further includes a bellows stop surrounding said second aperture and extending into the interior of said bellows.

5. The apparatus of claim 1, wherein said bellows includes an end plate of greater cross-sectional thickness than the remainder of said bellows.

6. The apparatus of claim 1, wherein said sealing means is a metal element.

7. The apparatus of claim 6, wherein said first and second apertures include frustoconical bores and said sealing means comprises a double-ended frustoconical sealing cone.

8. The apparatus of claim 1, wherein said sealing means comprises an O-ring, and one of said pressure housing and said base includes a recess to accommodate said O-ring.

9. The apparatus of claim 1, further including means for locking said second chamber in communication with said first chamber.

10. An apparatus for isolating the sensing element of a pressure transducer from a hostile fluid environment, comprising:
  a pressure housing defining a chamber proximate one end thereof, said chamber enclosing said sensing element and having an axially disposed aperture extending therefrom into the base of an internally threaded cavity;
  a bellows capsule including a substantially circular base having an axial aperture therethrough extending into and through a tubular bellows stop protruding therefrom and a metal bellows disposed over said bellows stop and welded at its open end to said base;
  a shell disposed over said bellows and secured to said pressure housing, defining a chamber for receiving said hostile fluid;
  sealing means disposed between said cavity base and said base for sealed communication from said hostile fluid environment between said apertures; and
  an isolation liquid completely filling said chamber and said bellows.

11. The apparatus of claim 10, wherein said sealing means comprises a double-ended metal cone and said cavity base and said bellows base include frustoconical bores adapted to receive and maintain said cone therebetween when said bellows capsule is made up with said bellows capsule cavity.

12. The apparatus of claim 10, wherein said sealing means is an O-ring, and one of said cavity base and said bellows base includes a recess therein to accommodate said O-ring.

13. The apparatus of claim 10, wherein said cavity is of a depth greater than that of said bellows capsule, and said apparatus further includes a threaded locking clamp nut threaded into said cavity above said bellows capsule.

14. An apparatus for isolating the sensing element of a pressure transducer from a hostile fluid environment, comprising:
  a housing defining a first chamber enclosing said sensing element and having a first aperture through a wall thereof;
  a second chamber defined by the interior of a bellows sealed to a base having a second aperture therethrough, said base including an integral bellows stop extending into the interior of said bellows;
  securing means for attaching said bellows base to said housing with said first and second apertures in sealed communication from said hostile fluid environment;
  an isolation liquid completely filling said first and second chambers and said communicating apertures; and
  an environmental fluid chamber surrounding said bellows for subjecting the exterior thereof to said environmental fluid in isolation from said isolation liquid.

15. The apparatus of claim 14, wherein said bellows includes an end plate of greater cross-sectional thickness than the remainder of said bellows.

16. The apparatus of claim 14, wherein said sealed communication provided by said securing means comprises a metal to metal seal.

17. The apparatus of claim 14, wherein said securing means include first threads associated with said housing and second, cooperating threads associated with said bellows base.

18. The apparatus of claim 14, wherein said securing means further includes mating conical and frustoconical sealing surfaces for effecting said sealed communication of said first and second apertures.

19. The apparatus of claim 14, wherein said environmental fluid chamber comprises a cylindrical shell disposed over said bellows.

* * * * *